(12) United States Patent
Bhattacharyya et al.

(10) Patent No.: US 11,660,574 B2
(45) Date of Patent: May 30, 2023

(54) DEVICES AND METHODS FOR REMOVING PERFLUORINATED COMPOUNDS FROM CONTAMINATED WATER

(71) Applicant: University of Kentucky Research Foundation, Lexington, KY (US)

(72) Inventors: Dibakar Bhattacharyya, Lexington, KY (US); Anthony Saad, Lexington, KY (US); Rollie Mills, Lexington, KY (US); Lindell Ormsbee, Lexington, KY (US); M. Abdul Mottaleb, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 262 days.

(21) Appl. No.: 16/885,369

(22) Filed: May 28, 2020

(65) Prior Publication Data
US 2021/0370241 A1    Dec. 2, 2021

(51) Int. Cl.
*B01D 69/14* (2006.01)
*C02F 1/28* (2023.01)
*B01D 69/12* (2006.01)
*B01D 71/34* (2006.01)
*B01J 20/28* (2006.01)
*B01J 20/26* (2006.01)
*B01J 20/32* (2006.01)
(Continued)

(52) U.S. Cl.
CPC ......... *B01D 69/147* (2013.01); *B01D 69/125* (2013.01); *B01D 71/34* (2013.01); *B01J 20/267* (2013.01); *B01J 20/2805* (2013.01); *B01J 20/28047* (2013.01); *B01J 20/321* (2013.01); *B01J 20/3483* (2013.01); *C02F 1/285* (2013.01); *C02F 1/288* (2013.01); *B01D 2323/28* (2013.01); *B01D 2323/30* (2013.01); *B01D 2323/40* (2013.01); *B01D 2323/46* (2013.01); *B01D 2325/12* (2013.01); *C02F 2101/36* (2013.01)

(58) Field of Classification Search
CPC .. B01D 69/147; B01D 69/14; B01D 2325/12; B01D 61/18; B01D 2201/165; B01D 2201/16; B01D 2201/46; B01D 2313/18; C02F 2303/16; C02F 2201/005; C02F 2209/02
See application file for complete search history.

(56) References Cited

U.S. PATENT DOCUMENTS

2009/0001019 A1*    1/2009    Frometa .................. B01D 69/02
                                                                    210/188

FOREIGN PATENT DOCUMENTS

WO    WO-2019091937 A1 *    5/2019
WO    WO-2020212881 A1 *   10/2020    .............. C02F 1/686

OTHER PUBLICATIONS

Liu et al. (Radiation Physics and Chemistry 76, 2007, p. 707-713). "Temperature-sensitive porous membrane production through radiation co-grafting of NIPAAm on/in PVDF porous membrane". (Year: 2007).*

(Continued)

*Primary Examiner* — Ryan B Huang
(74) *Attorney, Agent, or Firm* — Stites & Harbison PLLC; Warren D. Schickli

(57) ABSTRACT

Purification devices and methods remove perfluorinated compounds (PFCs) from PFC-contaminated water using temperature swing adsorption and desorption.

6 Claims, 15 Drawing Sheets

(51) Int. Cl.
    *B01J 20/34*          (2006.01)
    *C02F 101/36*      (2006.01)

(56) References Cited

OTHER PUBLICATIONS

Saad, Anthony, et al., Thermo-responsive adsorption-desorption of perfluoroorganics from water using PNIPAm hydrogels and pore functionalized membranes; Journal of Membrane Science 599 (Jan. 17, 2020) 117821.

* cited by examiner

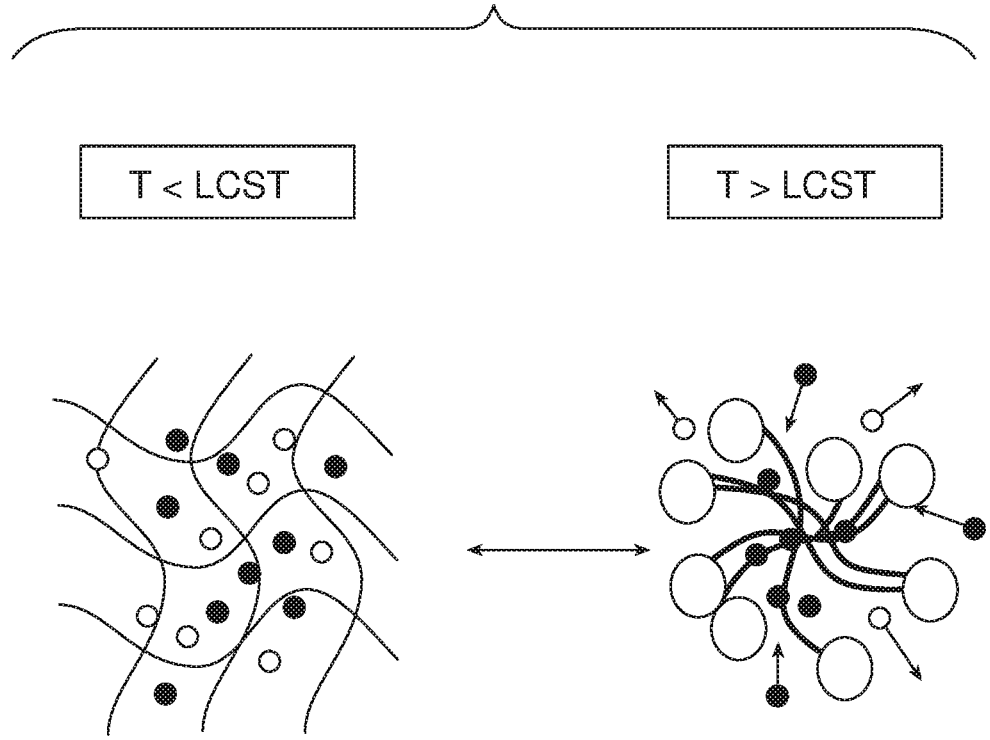

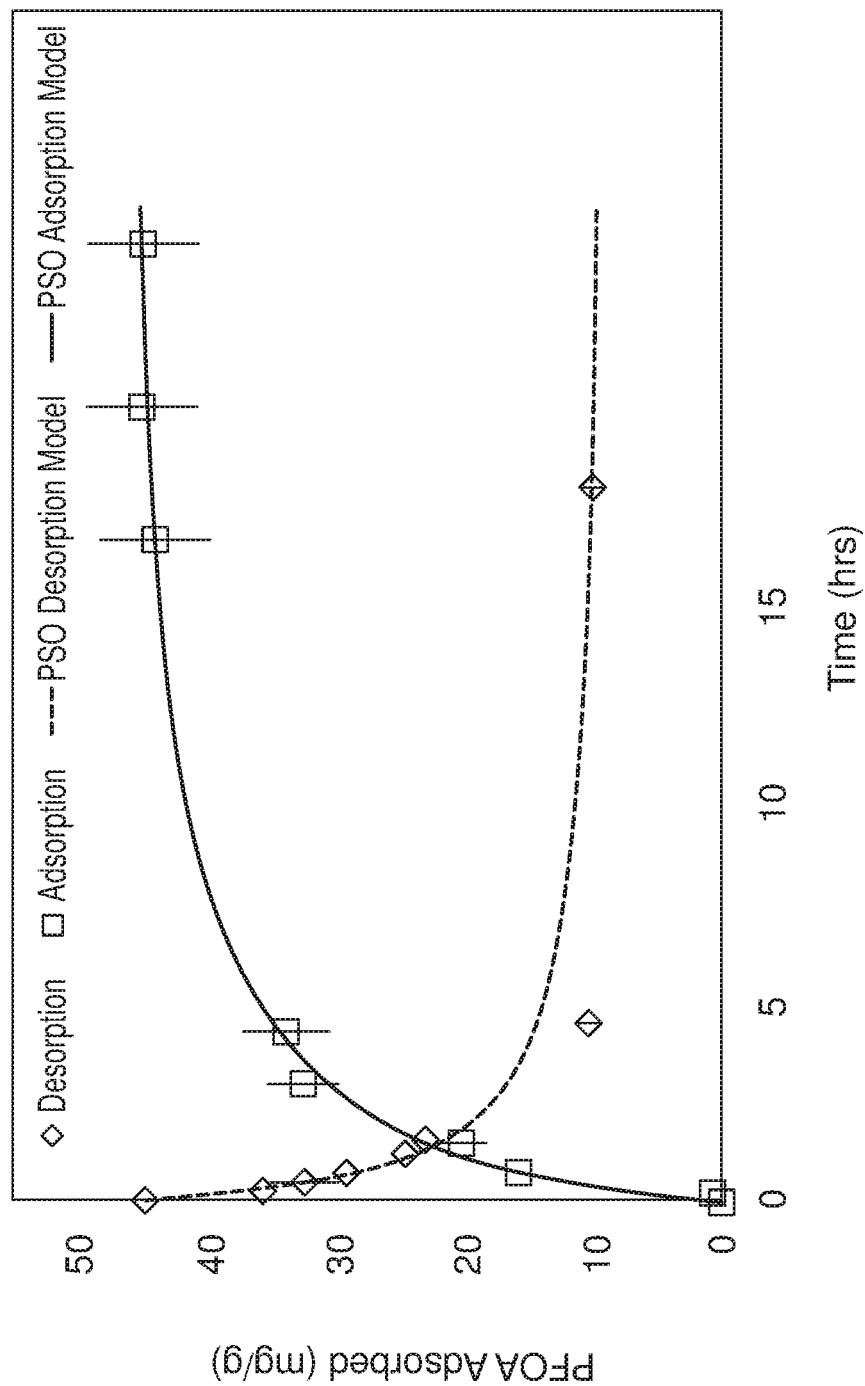

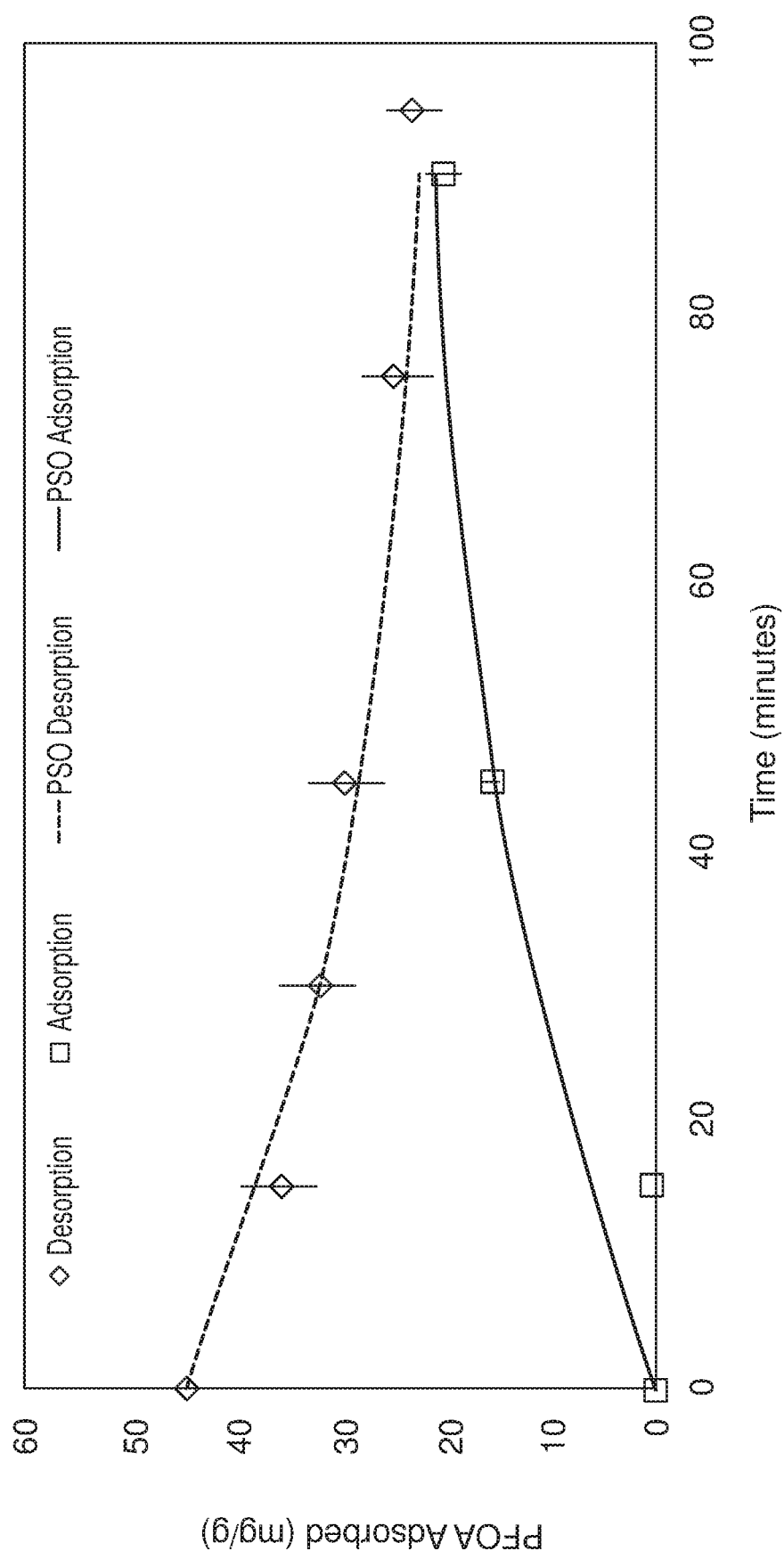

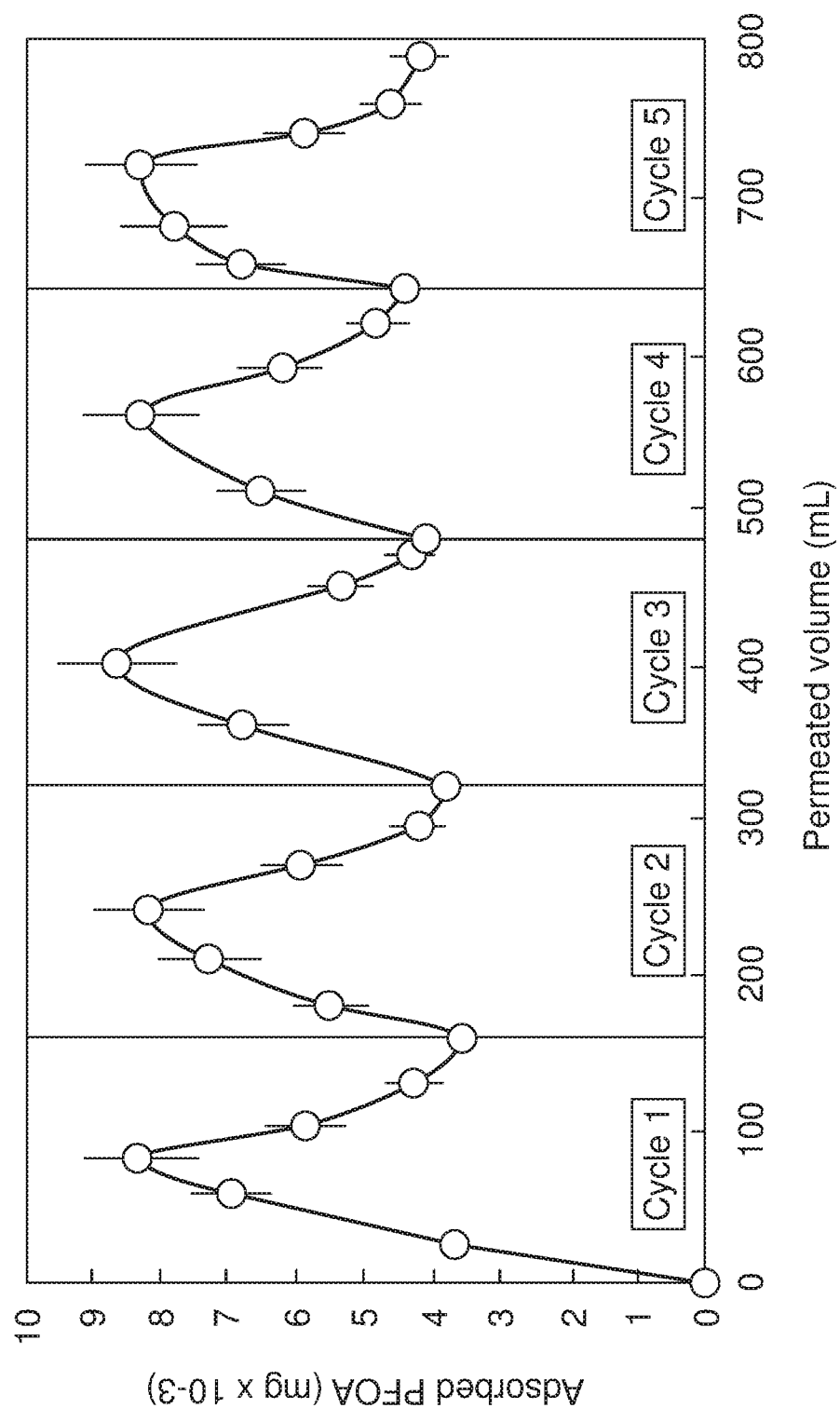

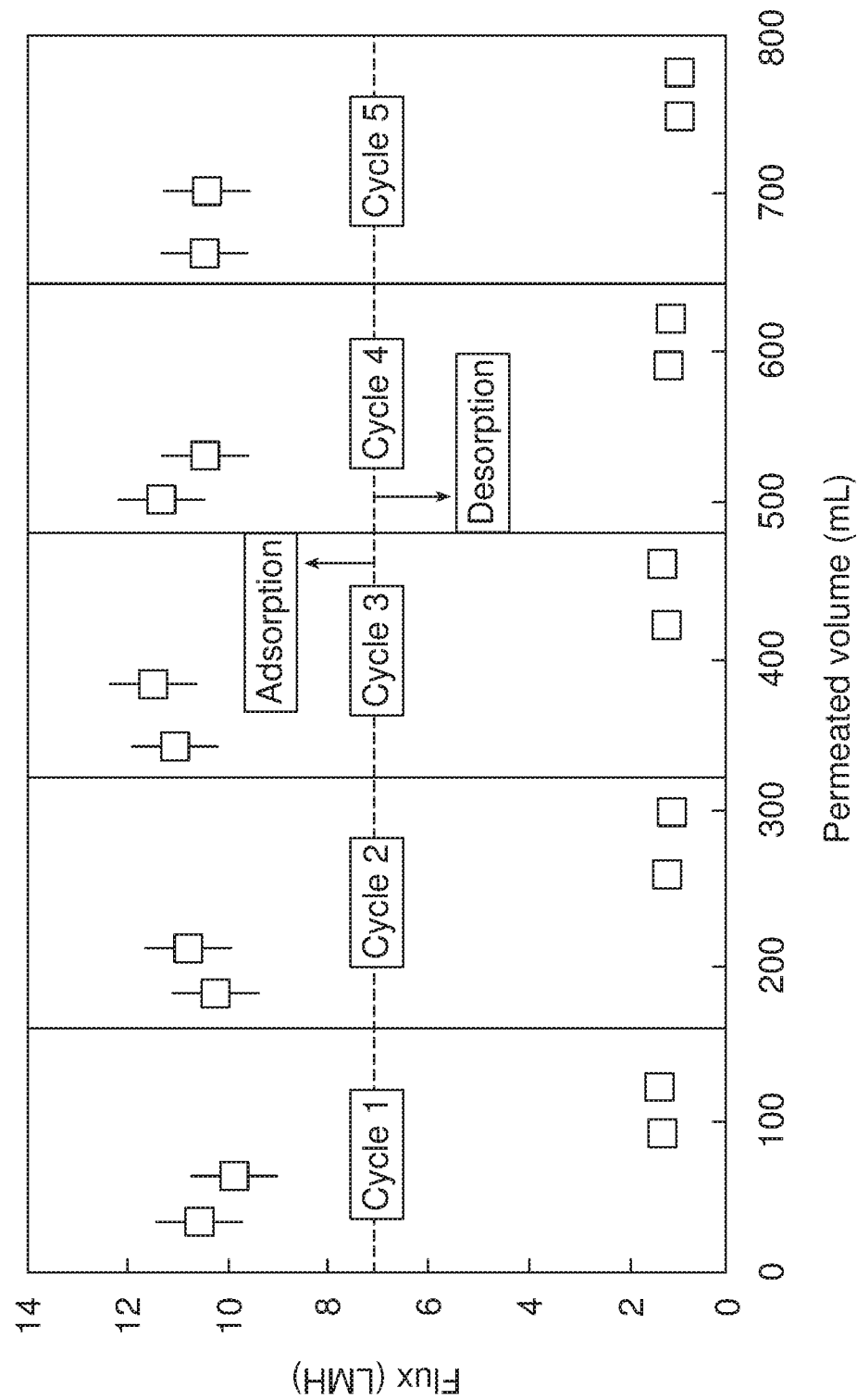

DEVICES AND METHODS FOR REMOVING PERFLUORINATED COMPOUNDS FROM CONTAMINATED WATER

GOVERNMENT SUPPORT

This invention was made with government support under Grant No. P42ES007380 awarded by the Departments of NIH-NIEHS-SRC and Grant No. 1355438 provided by NSF KY EPSCoR. The government has certain rights in the invention.

TECHNICAL FIELD

This document relates generally to devices and methods for removing perfluorinated compounds (PFCs) from PFC-contaminated water.

BACKGROUND

Perfluorinated compounds (PFCs) such as perfluorooctanoic acid (PFOA) have gained much attention as emerging pollutants due to their environmentally persistent nature and toxicity concerns that threaten water safety. Due to their thermal stability, these highly fluorinated compounds have been used since the 1960s for a variety of purposes including: protective coatings, lubricants, surfactants, additives, and repellants. Methods to remove them from contaminated wastewater, groundwater, and drinking water continue to gain importance due to their continued production and toxicity. PFC concentrations in contaminated wastewater and groundwater samples range from below 0.1 ng/L to over 1000 mg/L values. This document relates to new and improved devices and methods for temperature responsive PFC adsorption and desorption from water thereby allowing for efficient and effective PFC-decontamination of a water supply.

SUMMARY

In accordance with the purposes and benefits described herein, a new and improved method is provided for removing PFCs from PFC-contaminated water. That method comprises the steps of: (a) contacting the PFC-contaminated water with a PFC-adsorbing temperature responsive polymer hydrogel and (b) purifying the PFC-contaminated water by adsorbing PFCs from the PFC-contaminated water with the PFC-adsorbing temperature responsive polymer hydrogel when a temperature of the PFC-adsorbing temperature responsive polymer hydrogel is above a predetermined temperature.

The method may also include the steps of: (a) desorbing the PFCs from the PFC-adsorbing temperature responsive polymer hydrogel when the temperature of the PFC-adsorbing temperature responsive polymer hydrogel is below the predetermined temperature and (b) regenerating the PFC-adsorbing temperature responsive polymer hydrogel for adsorption of PFCs.

Still further, the method may include the step of repeatedly swinging the temperature of the PFC-adsorbing temperature responsive polymer hydrogel above the predetermined temperature to adsorb PFCs from the PFC-contaminated water and below the predetermined temperature to release PFCs from the PFC-adsorbing temperature responsive polymer hydrogel and thereby regenerate the PFC-adsorbing temperature responsive polymer hydrogel.

In one or more of the many possible embodiments of the method, the method includes the step of flowing the PFC-contaminated water through a membrane incorporating the PFC-adsorbing temperature responsive polymer hydrogel in pores of that membrane.

The method may also include the step of selecting the PFC-adsorbing temperature responsive polymer hydrogel from a group of polymers consisting of poly-N-isopropylacrylamide (PNIPAm), substituted poly-N-isopropylacrylamide, poly(vinyl ether), poly(N-vinyl caprolactam), poly(N-vinyl isobutyramide) and combinations thereof. Still further, the method may include selecting the membrane from a group of membranes consisting of a polyvinylidene fluoride (PVDF) membrane, a polysulfone membrane, a polyethersulfone membrane, a cellulose acetate membrane, a cellulose membrane, a polypropylene membrane and combinations thereof.

In one or more of the many possible embodiments of the method, the method may include cooling the PFC-adsorbing temperature responsive polymer hydrogel in a cooling fluid to release PFCs from the PFC-adsorbing temperature responsive polymer hydrogel, regenerate the PFC-adsorbing temperature responsive polymer hydrogel and collect the PFCs in the cooling fluid. Further, the method may include using water, salt water, alcohols, methanol, ethanol or combinations thereof as the cooling fluid.

In accordance with yet another aspect, a purification device is provided for removing perfluorinated compounds (PFCs) from PFC-contaminated water. That purification device comprises a membrane including a PFC-adsorbing temperature responsive polymer hydrogel in pores of the membrane.

In one or more of the many possible embodiments of the device, the device includes a contactor in which the membrane is contacted with the PFC-contaminated water and a temperature of the PFC-adsorbing temperature responsive polymer hydrogel is raised above a predetermined temperature at which PFCs are adsorbed from the PFC-contaminated water by the PFC-adsorbing temperature responsive polymer hydrogel.

In one or more of the many possible embodiments of the device, the device further includes a heating device heating at least one of the PFC-contaminated water and the PFC-adsorbing temperature responsive polymer hydrogel in the contactor.

In one or more of the many possible embodiments of the device, the device further includes a cooling device for cooling at least one of a cooling fluid and the PFC-adsorbing temperature responsive polymer hydrogel in the contactor to release PFCs from the PFC-adsorbing temperature responsive polymer hydrogel, regenerate the PFC-adsorbing temperature responsive polymer hydrogel and collect the PFCs in the cooling fluid.

In one or more of the many possible embodiments of the device, the device includes a cooling solvent source, a PFC-contaminated water source and an inlet valve selectively connecting the cooling solvent source and the PFC-contaminated water source with the contactor.

In one or more of the many possible embodiments of the device, the device includes a discharge valve downstream from the membrane having a first outlet for treated water and a second outlet for cooling fluid with PFCs.

In one or more of the many possible embodiments of the device, the device includes a drain valve downstream from the discharge valve, the drain valve having a PFC recovery outlet and a cooling fluid recycling outlet connected to the cooling solvent source.

In accordance with yet another aspect, a method of making a water purification device is provided. That method comprises polymerizing a PFC-adsorbing temperature responsive polymer hydrogel in situ in pores of a membrane.

The method may further include the step of using a bisacrylamide cross linker during polymerization. The method may also include the step of selecting the PFC-adsorbing temperature responsive polymer hydrogel from a group of polymers consisting of poly-N-isopropylacrylamide (PNIPAm), substituted poly-N-isopropylacrylamide, poly(vinyl ether), poly(N-vinyl caprolactam), poly(N-vinyl isobutyramide) and combinations thereof. Still further, the method may include the step of selecting the membrane from a group of membranes consisting of a polysulfone membrane, a polyethersulfone membrane, a cellulose acetate membrane, a polypropylene membrane, a polyester membrane, a polyacrylonitrile membrane, a polyamide membrane, a polyimide membrane, a PVDF membrane and combinations thereof.

In the following description, there are shown and described several embodiments of the new and improved (a) method of removing PFCs from PFC-contaminated water, (b) device for removing PFCs from PFC-contaminated water and (c) method of making a water purification device. As it should be realized, the methods and device are capable of other, different embodiments and their several details are capable of modification in various, obvious aspects all without departing from the methods and device as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the purification device and related methods and together with the description serve to explain certain principles thereof.

Figure 3:
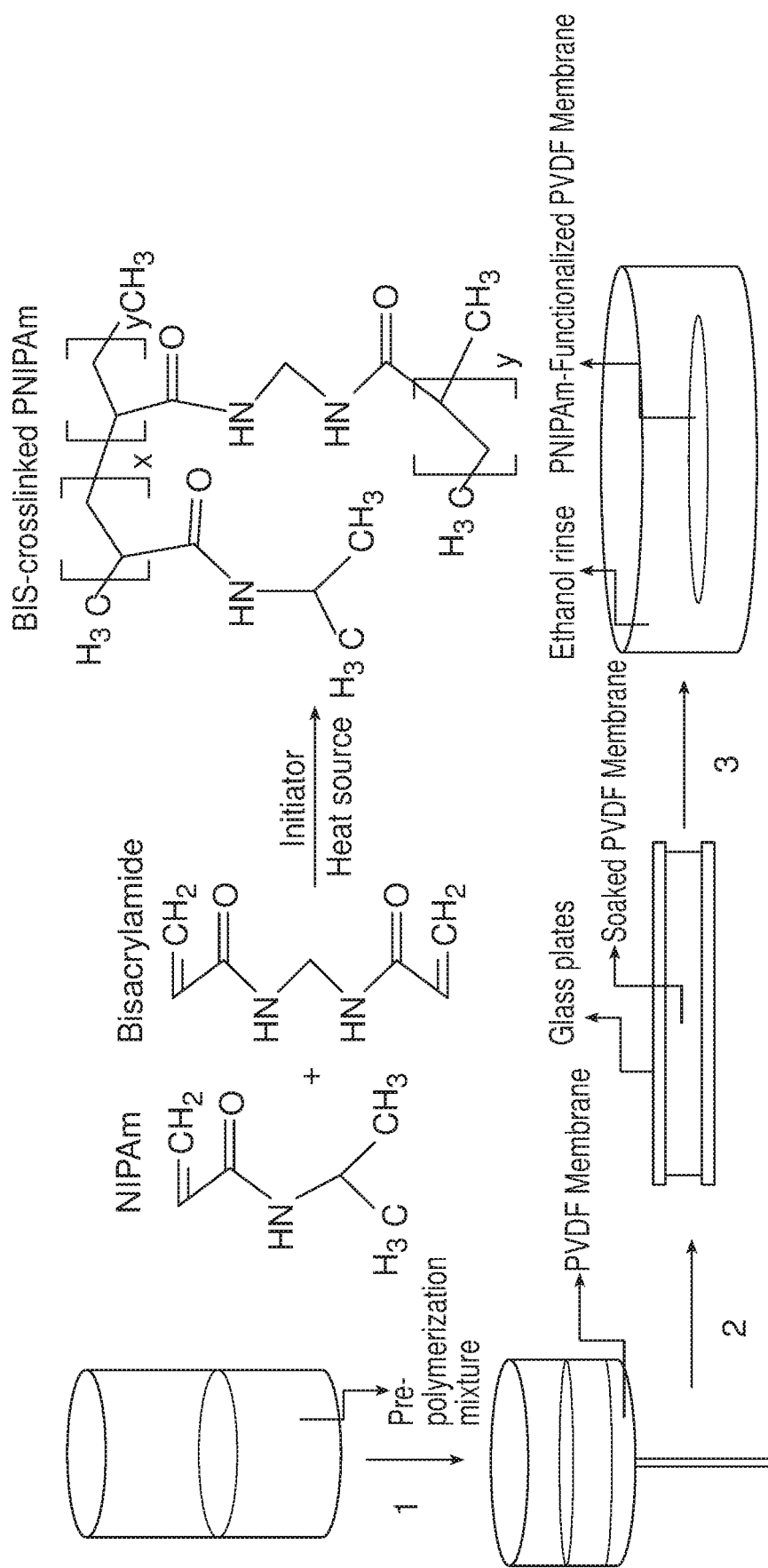

FIG. 3 is a schematic of the membrane functionalization process. In step 1, the pre-polymerization mixture is passed through the membrane to wet the pores. In step 2, the soaked membrane is placed between two glass plates and heated to 70° C. for two hours. In step 3, the functionalized membrane is washed in ethanol to remove unreacted polymer.

Figure 4A:
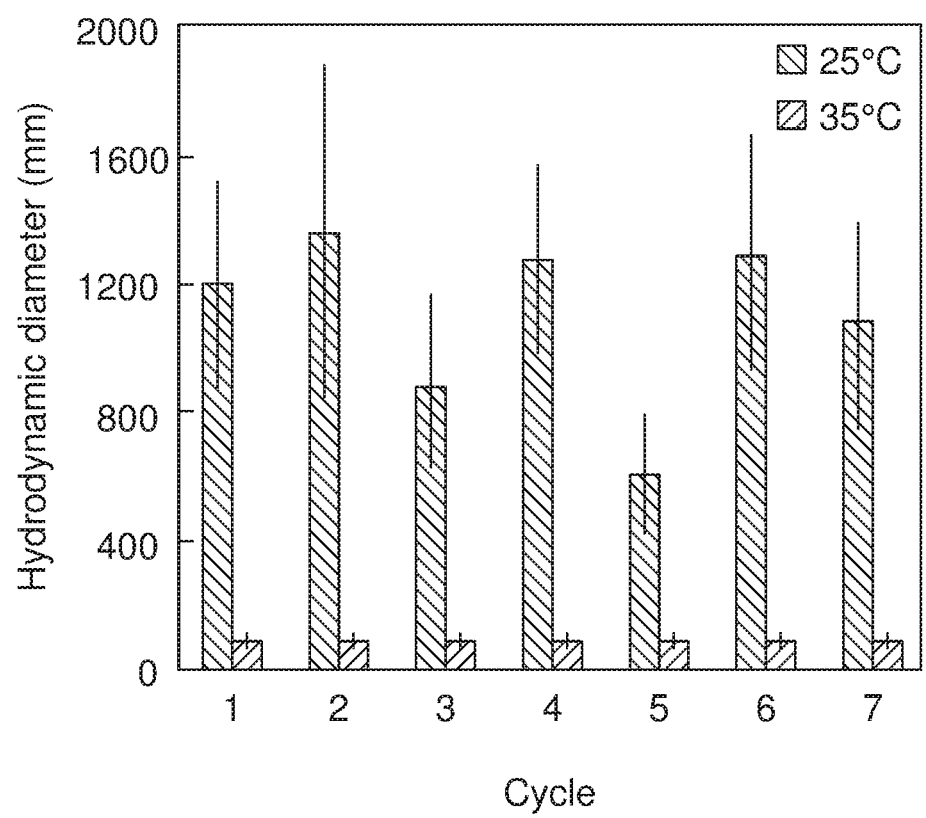

FIG. 4a illustrates hydrodynamic diameter (number average) of PNIPAm hydrogels (13 wt % NIPAm, 3 mol % bisacrylamide crosslinker, 2 mol % APS initiator) in aqueous solution measured using DLS changing the solution temperature from 25° C. to 35° C. over seven cycles.

Figure 4B:
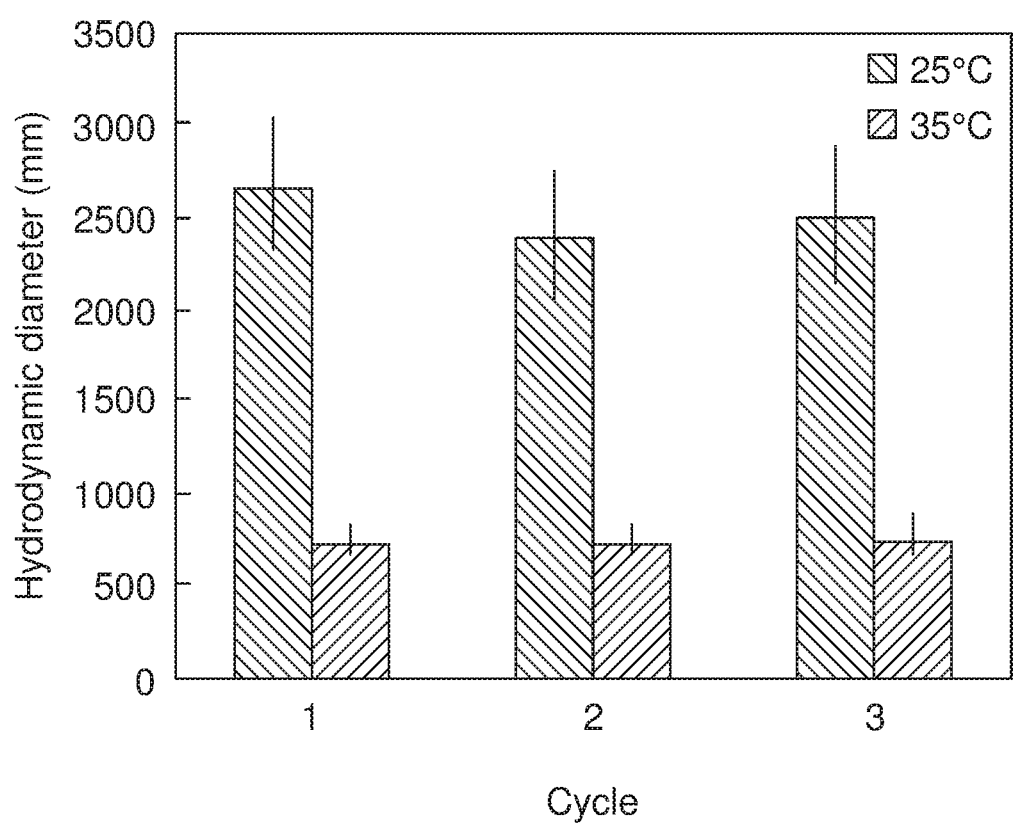

FIG. 4b illustrates hydrodynamic diameter (number average) of PNIPAm hydrogels (13 wt % NIPAm, 10 mol % bisacrylamide crosslinker, 2 mol % APS initiator) in aqueous solution measured using DLS changing the solution temperature from 25° C. to 35° C., over three cycles.

Figure 5:
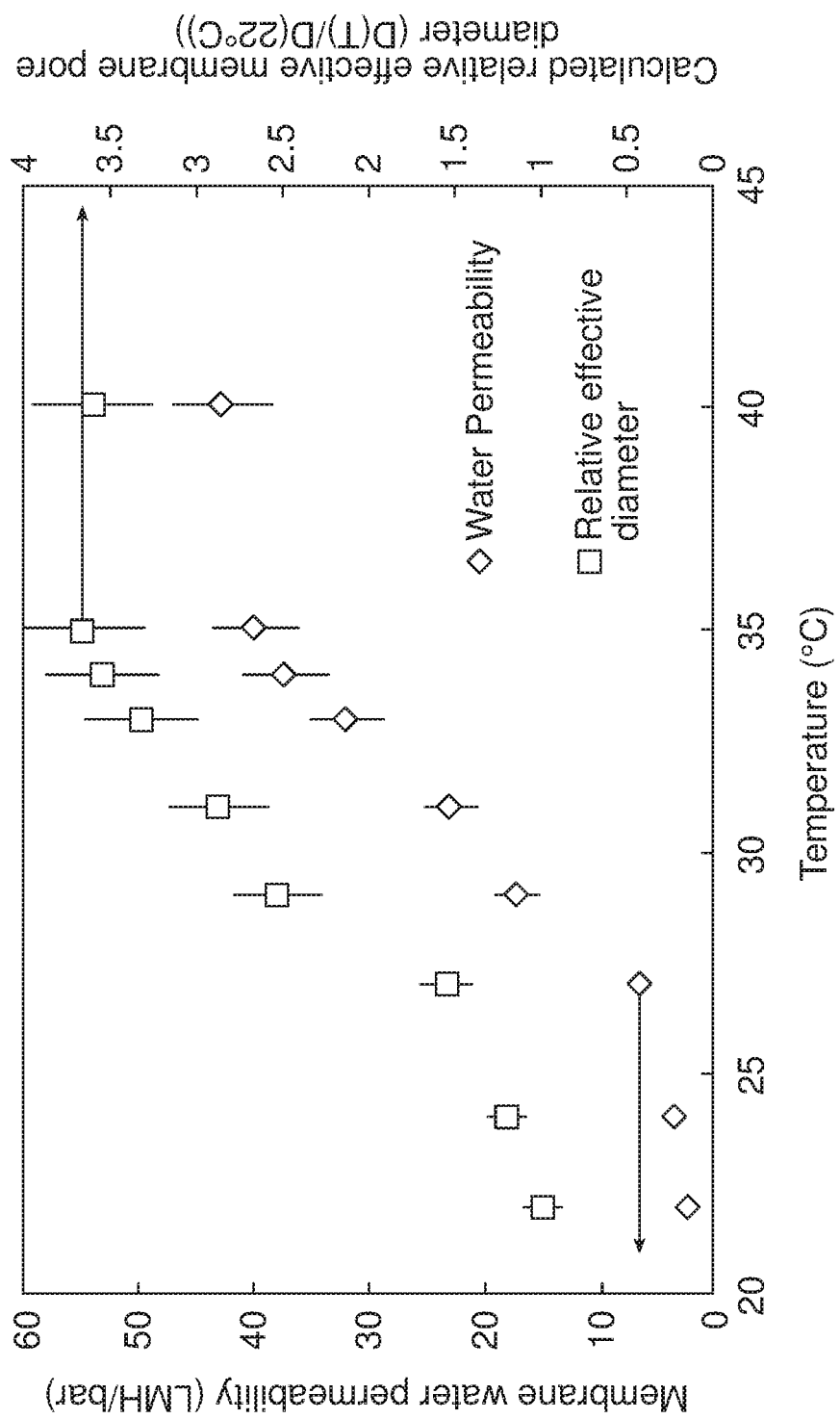

FIG. 5 illustrates the effect of temperature on the viscosity-corrected water permeation and effective membrane pore size of a PNIPAm-functionalized PVDF membrane (15 wt % PNIPAm in water, 3 mol % bisacrylamide crosslinker relative to NIPAm, 2 mol % APS initiator, area of 45 cm$^2$). As temperature is gradually increased from 22° C. to 41° C. at 3.5 bar, a sharp permeance increase (approximately 2-fold) occurs between 28° C. and 34° C., and relative effective membrane pore opening increases over 3-fold for the temperature range.

Figure 6A:
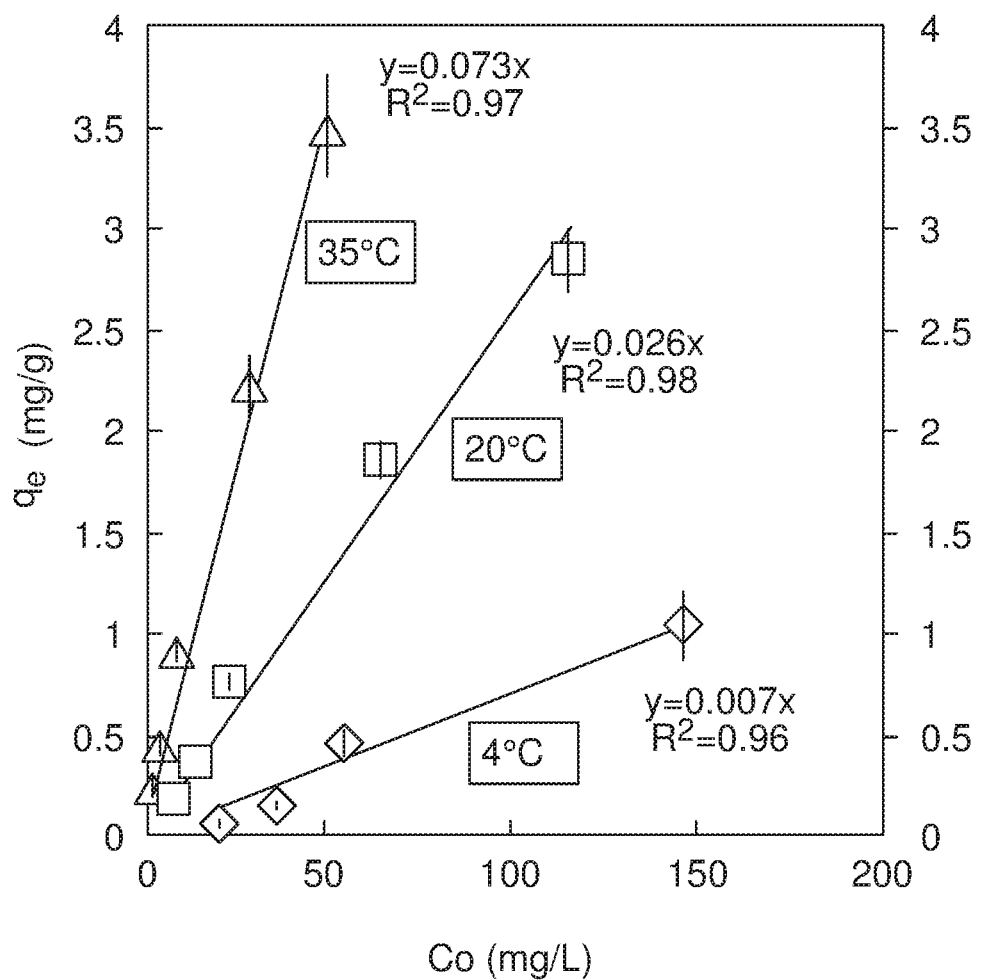

FIG. 6a illustrates adsorption isotherms of PFOA onto PNIPAm hydrogels in water. Initial aqueous PFOA samples had concentrations ranging from 25 mg/L to 250 mg/L, with 0.5 g of PNIPAm hydrogels (13 wt % NIPAm, 3 mol % BIS crosslinker, 2 mol % APS) and shaken at 100 rpm until equilibrium. Experimental data is fitted with Freundlich isotherms.

FIG. 6b illustrates adsorption of hydrophobic contaminants onto PNIPAm hydrogels in water above PNIPAm's lower critical solution temperature (LCST), where PFOA's hydrophobic tail preferentially resides in the dehydrated isopropyl groups of PNIPAm.

FIG. 7a illustrates adsorption (35° C.) and desorption (20° C.) of PFOA over one day using 2 g of PNIPAm hydrogels (d=1000 nm at 20° C.) in 500 mL of water with initial concentration of 1000 mg/L. PSO model was fit to the experimental data.

FIG. 7b illustrates adsorption (35° C.) and desorption (20° C.) of PFOA over the first 100 minutes using 2 g of PNIPAm hydrogels (d=1000 nm at 20° C.) in 500 mL of water with initial concentration of 1000 mg/L. PSO model was fit to the experimental data.

Figure 8:
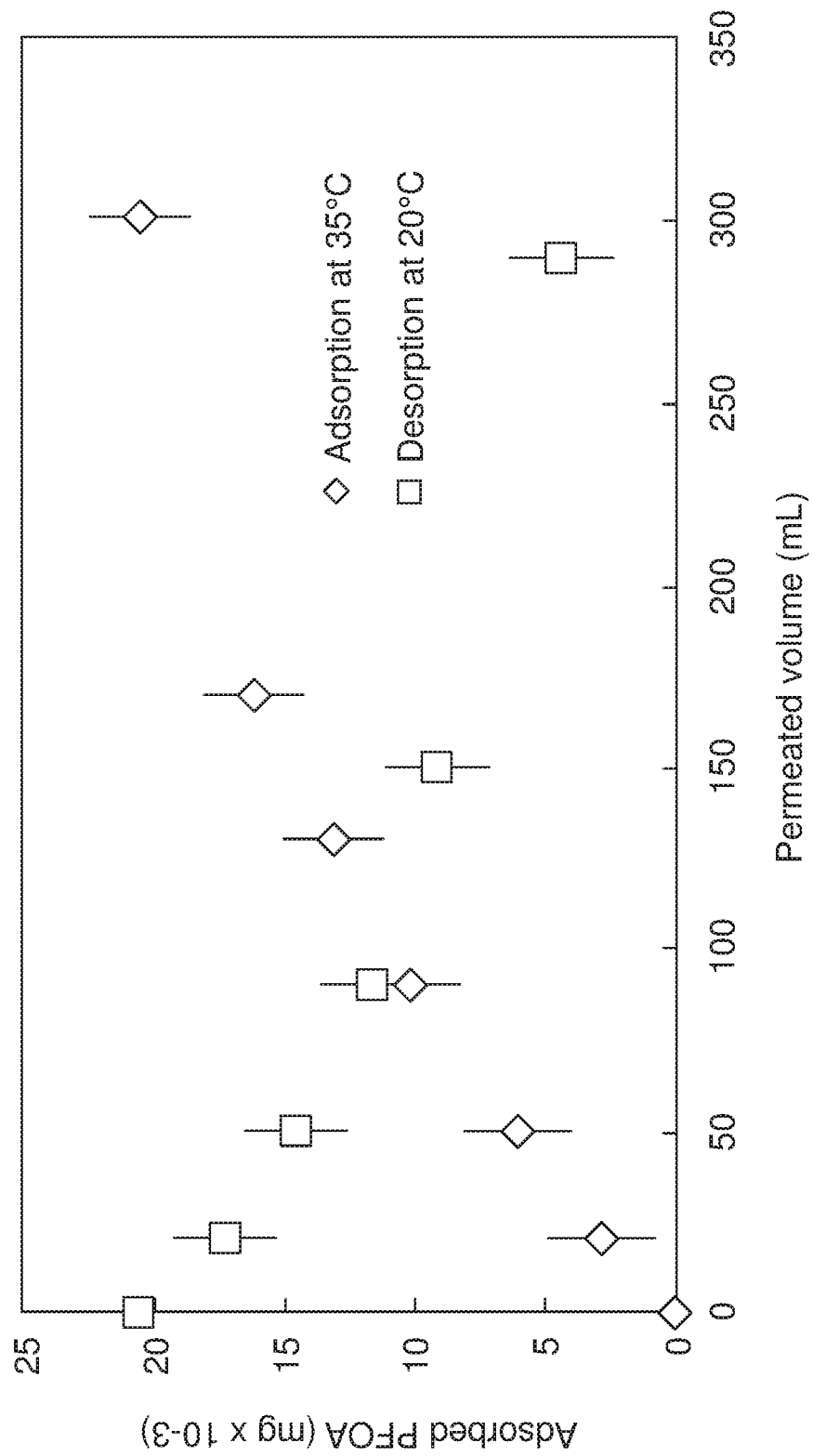

FIG. 8 illustrates adsorption and desorption of PFOA using PNIPAm functionalized PVDF 400 membrane (17% weight gain post polymerization, area of 45 cm$^2$) by convective flow at constant pressure of 3.5 bar in a dead-end filtration cell. The functionalized membrane adsorbed 20 µg after 300 mL of 0.5 mg/L aqueous PFOA was permeated at 35° C. 80% of adsorbed PFOA was desorbed after 300 mL of pure DIUF water was permeated.

FIGS. 9a and 9b illustrate adsorption and desorption of PFOA using PNIPAm functionalized PVDF 400 membrane (17% weight gain post polymerization, area of 45 cm$^2$) by convective flow over five adsorption/desorption cycles of 0.5 mg/L aqueous PFOA solution followed by pure water, at constant pressure of 3.5 bar. FIG. 9a shows five adsorption/desorption cycles demonstrate consistent temperature swing adsorption. FIG. 9b shows average flux above LCST is 10.6 LMH, while flux below LCST is 1.2 LMH, and is not affected by the presence of PFOA.

Figure 10A:
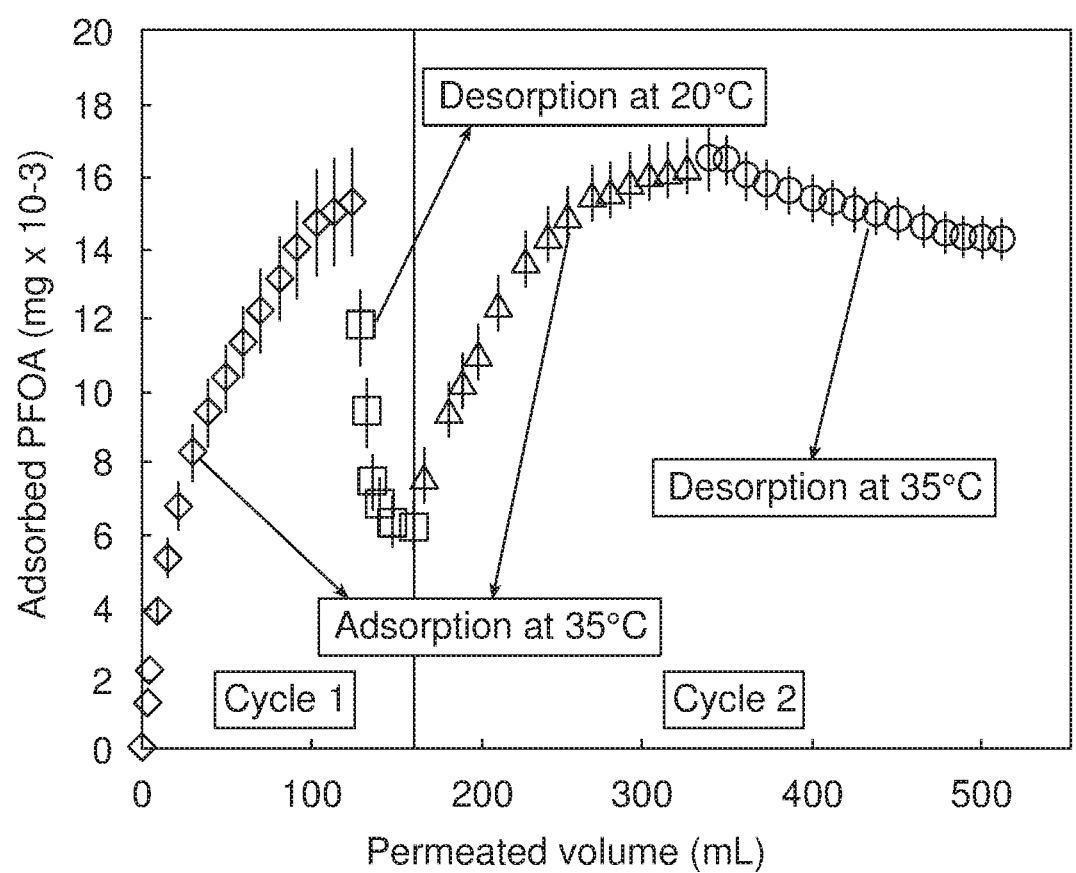

FIG. 10a illustrates two adsorption/desorption cycles of PFOA using PNIPAm functionalized PVDF 700 membrane (15% weight gain post polymerization, area of 45 cm$^2$) by convective flow at constant pressure of 2.75 bar. Desorption in cycle 1 was conducted at 20° C. compared to 35° C. in cycle 2, both with pure DIUF.

Figure 10B:
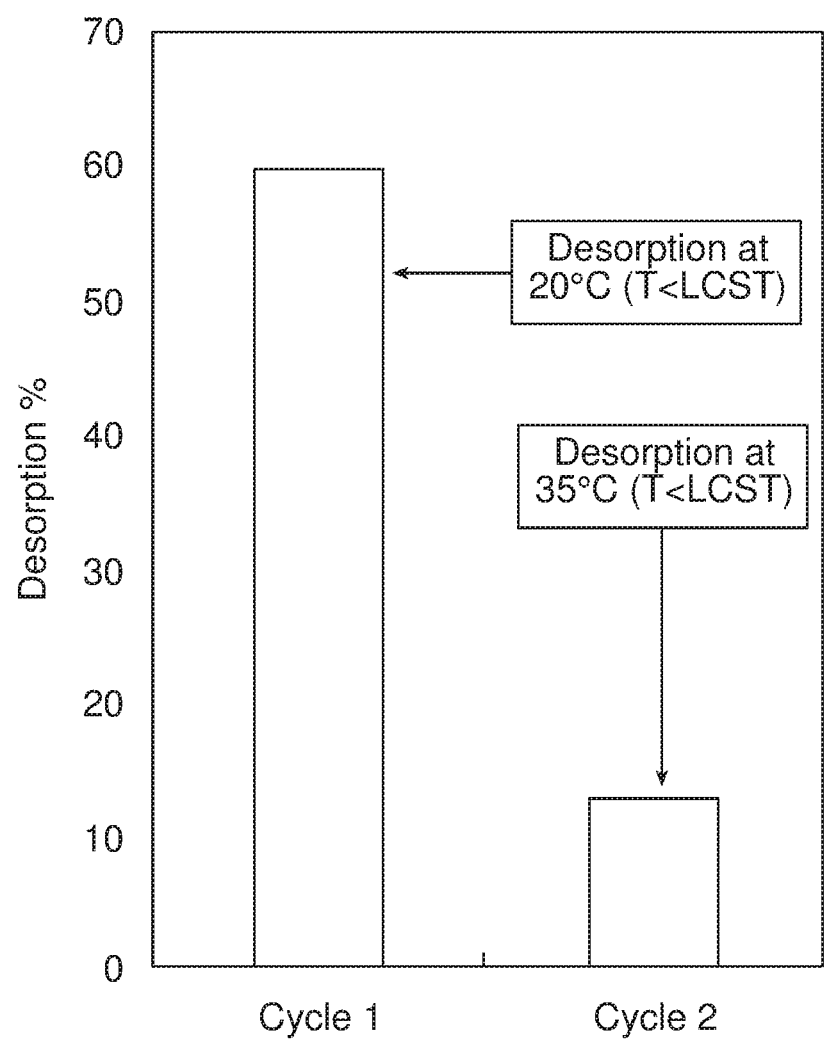

FIG. 10b illustrates comparison of desorption percentage using pure water at 20° C. versus pure water at 35° C. shows much higher desorption using pure water at 20° C. as expected from LCST behavior.

Reference will now be made in detail to the present preferred embodiments of the purification device and related methods, examples of which are illustrated in the accompanying drawing figures.

DETAILED DESCRIPTION

Figure 1:
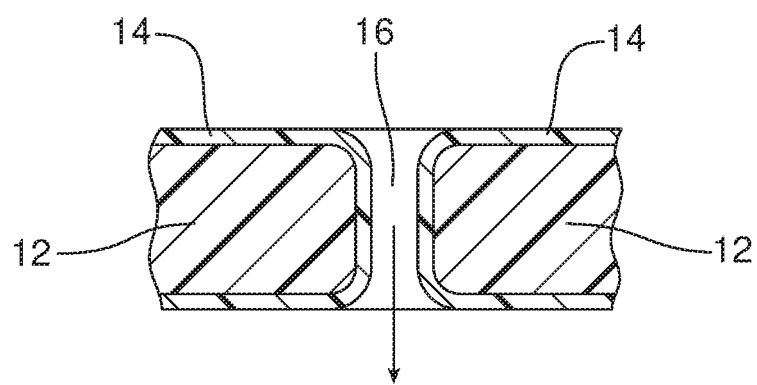
FIG. 1 is a detailed schematical view of a membrane illustrating a PFC-adsorbing temperature responsive polymer hydrogel polymerized in situ in a pore of that membrane.
Figure 2:
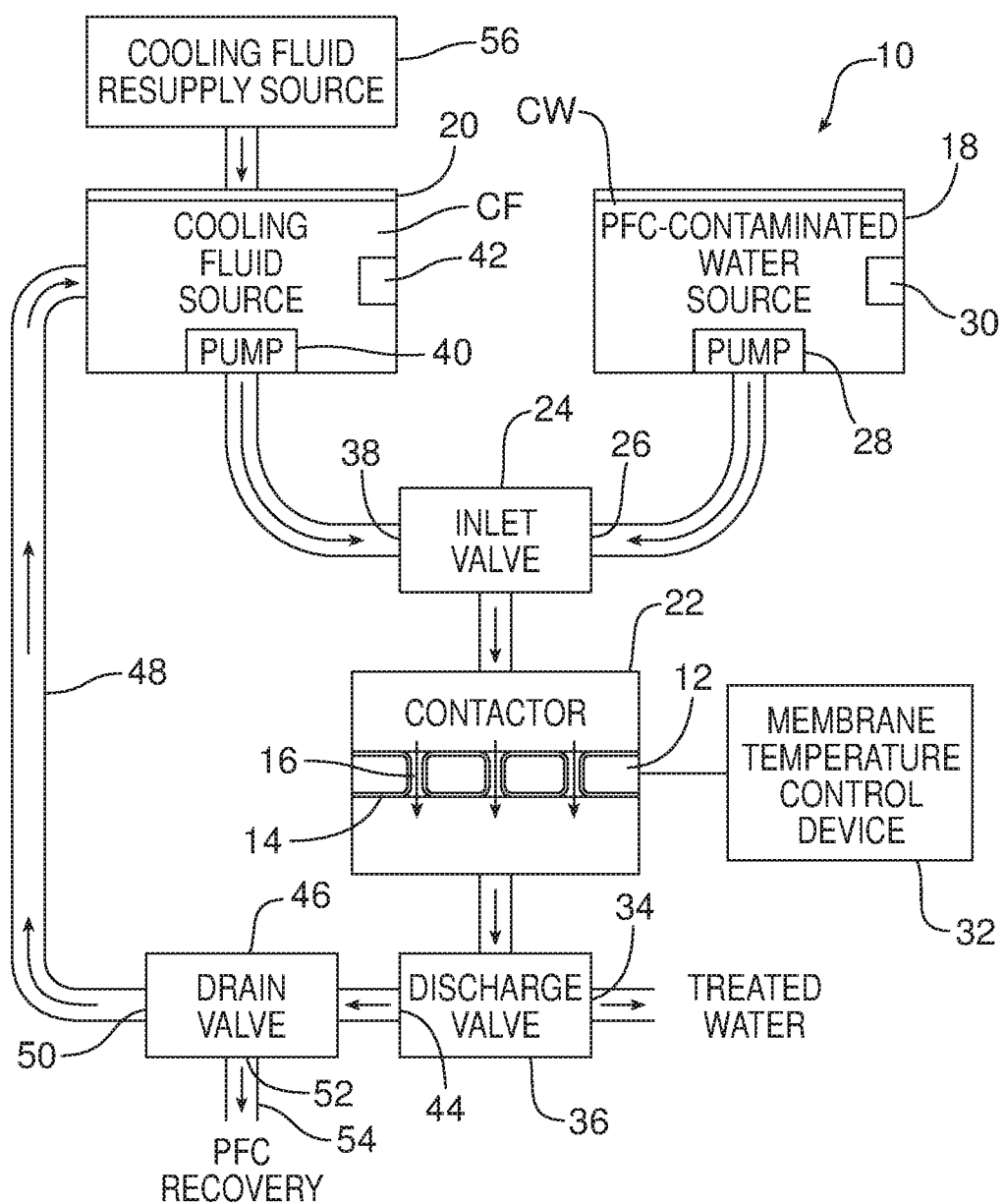
FIG. 2 is a schematic block diagram of one possible purification device adapted for removing PFCs from PFC-contaminated water.

Reference is now made to FIGS. 1 and 2 illustrating a new and improved purification device 10 for removing perfluorinated compounds (PFCs) from PFC-contaminated water CW. That purification device 10 includes a membrane 12 including a PFC-adsorbing temperature responsive polymer hydrogel 14 in pores 16 of the membrane.

The PFC-adsorbing temperature responsive polymer hydrogel 14 is adapted for temperature swing adsorption and desorption of PFCs. Polymers useful for this purpose include, but are not necessarily limited to, poly-N-isopropylacrylamide (PNIPAm), substituted poly-N-isopropylacrylamide, poly(vinyl ether), poly(N-vinyl caprolactam), poly(N-vinyl isobutyramide) and combinations thereof. Membranes 12 that are useful in the device 10 include, but are not necessarily limited to a polyvinylidene fluoride membrane, a polysulfone membrane, a polyethersulfone membrane, a cellulose acetate membrane, a cellulose membrane, a polypropylene membrane and combinations thereof.

The device 10 also includes a PFC-contaminated water source 18, a cooling fluid source 20, a contactor 22 holding the membrane 12, and an inlet valve 24 for selectively directing PFC contaminated water from the PFC-contaminated water source or cooling fluid from the cooling fluid source to the contactor.

More specifically, when the first inlet port 26 of the inlet valve 24 is opened (and the second inlet port 38 is closed), PFC-contaminated water is pumped by the pump 28 from the PFC-contaminated water source 18 through the inlet valve 24 to the contactor 22 where the membrane 12 is contacted with the PFC-contaminated water CW. The temperature of the PFC-adsorbing temperature responsive polymer hydrogel 14 is raised above a predetermined temperature at which PFCs are adsorbed from the PFC-contaminated water by the PFC-adsorbing temperature responsive polymer hydrogel by means of a heating device or heater, of a type known in the art, in the PFC-contaminated water source 18 and/or a membrane temperature control device 32 also of a type known in the art. The predetermined temperature is the lower critical solution temperature (LCST) for the particular PFC-adsorbing temperature responsive polymer hydrogel being used.

The treated water TW, with PFCs now removed and adsorbed on the membrane 12, then passes from the contactor 22 through the first or treated water outlet 34 of the discharge valve 36 where it may be subjected to further processing or released into the environment.

As the membrane 12 approaches full adsorption capacity, the pump 28 is deactivated and the inlet valve 26 is switched to close the first inlet port 26 and open the second inlet port 38. Then cooling fluid is pumped from the cooling fluid source 20 by the pump 40 through the inlet valve 24 to the contactor 22 where the membrane 12 is contacted by the cooling fluid. The temperature of the PFC-adsorbing temperature responsive polymer hydrogel 14 is lowered below a predetermined temperature at which PFCs are desorbed from the PFC-adsorbing temperature responsive polymer hydrogel by means of a cooling device or cooler 42, of a type known in the art, in the cooling fluid source 20 and/or the membrane temperature control device 32.

The cooling fluid and the PFCs desorbed from the hydrogel 14 of the membrane 12 then pass from the contactor 22 to the discharge valve 36 where they are directed through the now open second or cooling fluid return port 44 to the drain valve 46. Drain valve 46 may recycle the cooling fluid to the cooling fluid source 20 through the recycle line 48 when the cooling fluid has additional PFC recovery capacity. In contrast, if the PFC recovery capacity of the cooling fluid is below a predetermined threshold, the drain valve 46 is switched to close the cooling fluid recycling outlet 50 and to open the PFC recovery outlet 52 so as to direct the cooling fluid and entrained PFCs through line 54 for further processing. The volume of cooling fluid in the cooling fluid source 20 is then made up with cooling fluid from the resupply source 56.

The device 10 described above and illustrated in FIGS. 1 and 2 is useful in a method of removing PFCs from PFC-contaminated water. Generally, that method includes the steps of: (a) contacting the PFC-contaminated water CW with a PFC-adsorbing temperature responsive polymer hydrogel 14 and (b) purifying the PFC-contaminated water by adsorbing PFCs from the PFC-contaminated water with the PFC-adsorbing temperature responsive polymer hydrogel when a temperature of the PFC-adsorbing temperature responsive polymer hydrogel is above a predetermined temperature.

The method may also include the steps of: (a) desorbing the PFCs from the PFC-adsorbing temperature responsive polymer hydrogel 14 when the temperature of the PFC-adsorbing temperature responsive polymer hydrogel is below the predetermined temperature and (b) regenerating the PFC-adsorbing temperature responsive polymer hydrogel for adsorption of PFCs.

Still further, the method may include the step of repeatedly swinging the temperature of the PFC-adsorbing temperature responsive polymer hydrogel 14 above the predetermined temperature to adsorb PFCs from the PFC-contaminated water CW and below the predetermined temperature to release PFCs from the PFC-adsorbing temperature responsive polymer hydrogel and thereby regenerate the PFC-adsorbing temperature responsive polymer hydrogel.

As illustrated in FIG. 2 and described above, the method may include the step of flowing the PFC-contaminated water through a membrane 12 incorporating the PFC-adsorbing temperature responsive polymer hydrogel 14 in pores 16 of that membrane.

The method may also include the step of selecting the PFC-adsorbing temperature responsive polymer hydrogel from a group of polymers consisting of poly-N-isopropylacrylamide (PNIPAm), substituted poly-N-isopropylacrylamide, poly(vinyl ether), poly(N-vinyl caprolactam), poly(N-vinyl isobutyramide) and combinations thereof. Still further, the method may include selecting the membrane from a group of membranes consisting of a polyvinylidene fluoride membrane, a polysulfone membrane, a polyethersulfone membrane, a cellulose acetate membrane, a cellulose membrane, a polypropylene membrane and combinations thereof.

In one or more of the many possible embodiments of the method, the method may include cooling the PFC-adsorbing temperature responsive polymer hydrogel in a cooling fluid to release PFCs from the PFC-adsorbing temperature responsive polymer hydrogel, regenerate the PFC-adsorbing temperature responsive polymer hydrogel and collect the PFCs in the cooling fluid. Further, the method may include using water, salt water, alcohols, methanol, ethanol or combinations thereof as the cooling fluid.

A method is also provided for making the membrane 12 incorporating the PFC-adsorbing temperature responsive polymer hydrogel 14 in pores 16 of that membrane. That method generally includes the step of polymerizing a PFC-adsorbing temperature responsive polymer hydrogel in situ in the pores of the membrane.

The method may further include the step of using a bisacrylamide cross linker during polymerization. The method may also include the step of selecting the PFC-adsorbing temperature responsive polymer hydrogel from a group of polymers consisting of poly-N-isopropylacrylamide (PNIPAm), substituted poly-N-isopropylacrylamide, poly(vinyl ether), poly(N-vinyl caprolactam), poly(N-vinyl isobutyramide) and combinations thereof. Still further, the method may include the step of selecting the membrane from a group of membranes consisting of a polysulfone membrane, a polyethersulfone membrane, a cellulose acetate membrane, a polypropylene membrane, a polyester membrane, a polyacrylonitrile membrane, a polyamide membrane, a polyimide membrane, a PVDF membrane and combinations thereof.

The following Experimental Section provides additional details respecting the device and methods disclosed herein. The Experimental Section should be considered illustrative of the device and methods and not restrictive.

Experimental Section

Materials

Full scale hydrophilized polyvinylidene fluoride 700 (PVDF-700) membranes were obtained from Nanostone Water, Inc., Oceanside, Calif. (average pore size: 250 nm, thickness: 0.172 mm, porosity: 0.4). All chemicals used were reagent grade. N-isopropylacrylamide (NIPAm) was purchased from VWR at 97% purity. N,N0-methylenebisacrylamide (BIS, 99%) and ammonium persulfate (APS, 98%) were received from Acros Organics. Ethanol (>99.9%), and methanol (>99.9%) were purchased form Sigma-Aldrich. Perfluorooctanoic acid (PFOA, 97%) was purchased from Alfa Aesar as Sodium perfluorooctanoate and Perfluorooctanesulfonic acid (PFOS, 98%) were obtained from Matrix Scientific as Potassium perfluorooctanesulfonate. Ultra-high purity (UHP) nitrogen gas was purchased from Scott Specialty Gases. Deionized ultrafiltered water (DIUF) was acquired from Fisher Scientific.

Synthesis of PNIPAm Hydrogels

The PNIPAm hydrogels were prepared by temperature initiated free radical polymerization. First the DIUF was purged with UHP Nitrogen for 30 min because the presence of oxygen affects polymerization. The pre-polymerization mixture consisted of 30 g of NIPAm monomer in 200 mL of de-oxygenated DIUF, with 3 mol % BIS cross-linker and 2 mol % APS initiator for a molar ratio of NIPAm:BIS of 97:3. The solution was placed into petri dishes in a vacuum oven at 70° C. for 2 h. The hydrogels were then removed from the plates, freeze dried, and crushed using a mortar and pastel. The broken up crosslinked PNIPAm hydrogels were then placed in deionized water to wash away any unreacted NIPAm monomer.

Synthesis of PNIPAm-Functionalized PVDF Membranes

PNIPAm monomer (6 g, 13 wt %), BIS cross-linker (3 mol %), and APS initiator (2 mol %) were dissolved in de-oxygenated DIUF at room temperature to create the pre-polymerization mixture. The full-scale PVDF 700 membranes were developed in collaboration with Nanostone Sepro, Oceanside, Calif. These hydrophilized membranes are supported by a backing fabric for increased stability, with a relatively open structure uniform geometry. The full-scale membrane sheets were cut into circles with diameters of 14 cm and were weighed prior to being mixed in the pre-polymerization mixture for 5 min. The pre-polymerization mixture was then passed through the membrane at least 3 times using a vacuum pump in order to ensure the mixture was inside the membrane pores rather than only on the surface. The membrane surface was then dried using UHP nitrogen gas and placed between two glass plates and heated in an oven at 70° C. while being purged with UHP nitrogen for 2 h. The PNIPAm-functionalized PVDF 700 membrane was then removed from the oven and washed with dilute ethanol to remove any unreacted monomer and stored in DIUF overnight. The membrane's mass increased an average of 15% post-functionalization. FIG. 3 is a schematic of the membrane functionalization process.

Characterization and Analytical Methods

Attenuated Total Reflectance Fourier Transform Infrared (ATR-FTIR):

Attenuated total reflectance Fourier transform infrared (ATR-FTIR Varian 7000e) was used in order to confirm the presence of PNIPAm in the PVDF membrane. Samples of PNIPAm hydrogels as well as non-functionalized and PNIPAm-functionalized PVDF 700 membranes were analyzed to confirm successful polymerization of the blank PVDF membranes. PVDF membrane's $CF_2$ group's characteristic absorption band would be found at 1120-1280 $cm^{-1}$. NIPAm's —NH and —C=O groups' characteristic absorption bands would be found at 1540 $cm^{-1}$ and 1650$^{-1}$, respectively.

Dynamic Light Scattering (DLS) for Particle Size:

Dynamic light scattering (DLS) was used in order to determine the apparent number average hydrodynamic diameter of the hydrogels, and the temperature was varied from 25° C. to 35° C. for 7 cycles to observe swelling behavior. The crosslinking density of the hydrogels was then increased and DLS was used to determine the average hydrodynamic diameter by raising the temperature above the LCST for 3 cycles. The swelling capacity was then compared to the less crosslinked hydrogel.

Energy Dispersive X-Ray Spectroscopy (EDS) Analysis of PNIPAm Hydrogels with PFOA:

After PFOA adsorption, PNIPAm hydrogel samples were dried and analyzed using energy dispersive X-ray spectroscopy (EDS, Oxford Instruments X-Max$^N$ 80 detector). Hydrogel samples were freeze dried and mounted on the holder inside the scanning electron microscope chamber (FEI Helios Nanolab 660) and EDS analysis was performed in order to find the relative ratios of carbon, nitrogen, oxygen, and fluorine. Using the atomic ratios of fluorine, which only exists in PFOA, versus nitrogen, which only exists in PNIPAm, the adsorbed amount can be loosely predicted and compared to the equilibrium adsorption data.

Liquid Chromatography Mass Spectrometry (LC-MS/MS):

All PFOA and PFOS samples were analyzed by liquid chromatography mass spectrometry (LC-MS/MS) separation. UPLC coupled electrospray ionization tandem mass spectrometry was used in this study. A bench top binary prominence Shimadzu chromatograph (Model: LC-20 AD) equipped with SIL 20 AC HT autosampler that was interfaced with an AB SCIEX Flash Quant mass spectrometer (MS/MS) (Model: 4000 Q TRAP). Limit of detections (LOD) for target analytes were 0.25 ng/L at S/N=4. Seven calibration points with linear dynamic range (LDR) were 2.5-320 ng/mL with $R^2$ values of 0.99968.

Temperature-Responsive Flux Measurements

The PNIPAm-functionalized membrane was placed in a stirred cell acquired from Millipore in order to study its temperature responsive flux behavior. The cell was filled with DIUF and temperature was maintained using electrical heating tape. The cell had a digital thermocouple that enabled continuous monitoring of the temperature of the DIUF inside the cell. UHP nitrogen was used to pressurize the cell, which had a maximum pressure limit of 5.5 bars. Whenever the pressure was varied, water flux through the membrane was allowed to reach steady state before any samples were taken. When the temperature was varied, samples were only taken once the permeated water temperature was equal to the cell's internal temperature. Triplicate samples were taken to measure water flux by measuring permeated volume versus permeation time. Final runs were always conducted at conditions equal to the first run in order to test reversibility. Flux tests were performed using pure water at both 22° C. and at 35° C. with varying pressure in order to test the stability of the membrane, and can be found in the supporting information. In order to further examine the temperature responsive nature of the PNIPAm functionalized membrane, the pressure was held constant and flux was measured as temperature was varied from 22° C. to 40° C.

PFOA and PFOS Equilibrium Adsorption onto PNIPAm Hydrogels

Adsorption of aqueous perfluorooctanoic acid (PFOA) using PNIPAm hydrogels was studied in order to determine the equilibrium adsorption values for aqueous PFOA-PNIPAm systems at near freezing (4° C.), ambient (22° C.), and above LCST (35° C.) temperatures. Aqueous PFOA solutions (20 mL) were made using DIUF with concentrations ranging from 25 mg/L to 250 mg/L and adsorption was conducted using 0.5 g of PNIPAm hydrogels in each 20 mL vial. Three independent samples were analyzed for each concentration point, at each temperature. By plotting the equilibrium amount of PFOA adsorbed onto the hydrogels ($q_e$) versus the equilibrium PFAO concentration remaining in the aqueous phase ($C_e$), equilibrium adsorption curves can be experimentally determined for each isotherm.

The equilibrium adsorption isotherms of PFOA and PFOS were compared to calculated interaction parameter values. The different functional groups in the compounds yield different interaction parameters for the compounds. The apparent hydrogen bonding and dispersion interaction parameters of the various functional groups can be compared to the adsorption extent at temperatures above and below PNIPAm's LCST in order to explain relative adsorption behavior.

PFOA Adsorption/Desorption Kinetics Using PNIPAm Hydrogel

The ability of PNIPAm particles to adsorb PFOA was studied as a function of time to determine the adsorption and desorption rates. Two grams of PNIPAm hydrogels were placed in 500 mL of water concentrated with 1000 ppm PFOA and shaken at 100 rpm in a temperature-controlled shaker set at 35° C., with samples taken at various time intervals up to 24 h. After reaching equilibrium, the hydrogels were removed from the aqueous PFOA solution and placed in DIUF and shaken at 100 rpm at 20° C., with samples taken at various time intervals up to 18 h. A sample volume of 1 mL was used in order to minimize the impact on the total solution concentration. Triplicate samples were always taken. Once taken, the sample was then analyzed using LCMS. Knowing the concentration of the aqueous phase at each point, the amount of adsorbed PFOA at each time interval was calculated by mass balance.

PFOA Adsorption onto PNIPAm-Functionalized PVDF Membranes Via Convective Flow

The PNIPAm-functionalized membrane was placed in a stirred cell acquired from Millipore in order to study its ability to adsorb and reversibly desorb PFOA as it is passed convectively through the membrane. In order to study adsorption, the cell was filled with 80 mL of DIUF concentrated with PFOA (0.5 mg/L) while the temperature was maintained at 35° C. using electrical heating tape. The cell had a digital thermocouple that enabled continuous monitoring of the temperature of the DIUF inside the cell. UHP nitrogen was used to pressurize the cell to 3.5 bar, yielding an average flux of 11 LMH. 80 mL of aqueous PFOA was passed through the membrane and the permeate was all collected in approximately 10 mL aliquots and PFOA concentrations were analyzed by LCMS using triplicate samples from each aliquot. Using mass balance, the amount of PFOA adsorbed in the membrane at each point could be calculated. Next, 80 mL of DIUF was placed in the cell at 22° C. with the pressure maintained at 3.5 bar in order to force the entire volume through the membrane to measure its desorption ability. Again, the entire permeate was collected in approximately 10 mL aliquots and the associated concentrations were analyzed using LCMS in order to determine the amount of desorbed PFOA. This adsorption/desorption study was repeated 5 times in order to test the long-term stability of the membrane and explore its ability for temperature swing adsorption.

Results and Discussion

Exploring PFOA adsorption onto PNIPAm hydrogels is important in order to determine the various adsorptive characteristics of the polymer prior to immobilizing it within membrane pores. Ultimately a functionalized membrane is needed for reversible adsorption over several cycles.

Swelling Studies of PNIPAm Hydrogels Using Dynamic Light Scattering

When the diameters of the 3 mol % crosslinked PNIPAm hydrogels were measured, the apparent hydrogel diameter decreased approximately by a factor of 10 when the temperature of the water was raised above its LCST. As shown in FIG. 4, the hydrogel diameter decreased from about 1000 nm to about 100 nm, indicating the successful polymerization and formation of the thermoresponsive PNIPAm hydrogels, and also indicating the repeatable thermoresponsive behavior of the hydrogels over several cycles. Adding a crosslinker is necessary for the stability of the hydrogels, and higher crosslinking density leads to more rigid particles. It was determined that even though 0.5 mol % BIS crosslinker enabled the greatest swelling change, a more stable polymer network was required to avoid the polymer chain being washed out when formed within membrane pores. Comparisons of individual linear PNIPAm chains to crosslinked PNIPAm gels found that crosslinked gels have a higher transition temperature. The crosslinking density of the PNIPAm hydrogels was varied in order to determine the effect on swelling capacity, which can be described as:

$$S = \frac{d_{swollen}}{d_{unswollen}} \quad (1)$$

Here, S represents the swelling capacity as the ratio of the apparent diameter of the hydrogels in the swollen state (25° C.) versus their apparent diameter in the un-swollen state (35° C.). The average swelling capacity was observed to be 10.3 for the hydrogels formed with 3 mol % crosslinker and 3.4 for the hydrogels formed with 10 mol % crosslinker, indicating that the swelling capacity of PNIPAm hydrogels is inversely related to crosslinking density. Furthermore, average diameter was larger for hydrogels made with higher cross-linking density in both swollen and collapsed states. The large standard deviation of hydrogel diameters in the swollen state can be attributed to the complexity of the chain entanglements, which will not always swell to the same extent.

Temperature Responsive Water Flux Through PNIPAm-Functionalized PVDF 700 Membranes PNIPAm is known to exhibit a conformational change as temperature is raised above its LCST of 32° C. As temperature is increased, the isopropyl and methylene groups dehydrate, causing the backbone to collapse and causing the hydrophilic functional groups in the PNIPAm to release bound water and hydrogen bond with each other instead. When functionalized within membrane pores, the collapsing of PNIPAm chains at higher temperatures results in larger effective pore diameters. The linearity of the flux tests at constant temperature while varying pressure indicates membrane stability, and yielded fluxes of 1.6 LMH/bar at 22° C. and 28.8 LMH/bar at 35° C.

Membrane Permeance Aspects:

Assuming laminar flow through uniform non-tortuous membrane pores and no slip at the wall, the Hagen-Poiseuille equation can be used to estimate relative pore diameters:

$$J_w = \frac{N\pi\Delta P}{A 8\eta L}\left(\frac{D}{2}\right)^4 \quad (2)$$

Here, ΔP represents the pressure differential (3.5 bar), N represents the number of pores, A represents the area of permeation (45 cm$^2$), η represents viscosity of water, L represents the membrane thickness (0.172 mm), and D represents the pore diameter. The viscosity of water is adjusted for temperature over the temperature range. Number of pores and pore length are assumed to be constant, confirmed by measuring membrane thickness across the temperature range. The recorded water permeance values increased with temperature, displaying a sharper increase of over 2-fold from between 28° C. and 34° C., shown in FIG. 5. The estimated relative effective pore diameters over the temperature range are also shown, demonstrating an increase of about 3.5-fold.

PFOA Equilibrium Adsorption onto PNIPAm Hydrogels

Adsorption of PFOA onto PNIPAm hydrogels was evaluated at various PFOA concentrations for three different temperatures. Due to relatively low water solubility, PFOA concentrations were varied between 25 and 250 ppm. For this low concentration range, the adsorption isotherms can be fitted using a Freundlich isotherm equation, which empirically describes adsorption of solutes from a liquid onto a solid.

$$q_e = K_d C_e^{1/n} \quad (3)$$

Here, $q_e$ (mg/g) represents the amount of solute (PFOA) adsorbed per unit weight of solid (PNIPAm) at equilibrium, in units of mg/g, while $C_e$ (mg/L) represents the equilibrium concentration of solute in solution (water) when the adsorbed amount is equal to $q_e$, and $K_d$ (L/g) is the distribution coefficient, and n is the correction factor. While, the Freundlich isotherm does not predict that adsorption maximum, this experiment explores the linear part of the isotherm.

The observed isotherms fit the experimental data well, as shown in FIG. 6. The $K_d$ values increased significantly as temperature was raised, with a larger jump between 20° C. and 35° C. due to the polymer's LCST value of 32° C. Freundlich adsorption isotherms for PFOA on PNIPAm gels yields $K_d$ values of 0.073 L/g at 35° C., 0.026 L/g at 22° C., and 0.007 L/g at 4° C. As temperature is increased, the isopropyl groups of the PNIPAm particles dehydrate fast, and increase adsorption of PFOA due to its hydrophobic tail. This behavior, where hydrophobic contaminants will partition into the more dehydrated parts of the polymer, is shown in FIG. 6.

The large increase in hydrogel adsorption capacity of PFOA from 4° C. to 22° C. cannot be attributed to the LCST conformational change of PNIPAm and therefore requires another explanation. Futscher et al. studied the conformational changes of PNIPAm versus its NIPAm monomer using Fourier transform infrared spectroscopy to probe changes, and found that NIPAm exhibits a nearly linear change with temperature compared to PNIPAm, which displays a discontinuous shift across the LCST. The presence of NIPAm in the hydrogels is a reasonable explanation for the difference. There was a significant change in partitioning when temperature was raised in the region below PNIPAm's LCST. PFOA however is structured like a surfactant with a long hydrophobic tail and a hydrophilic carboxylic head, leading to interaction with both the hydrophobic and hydrophilic functional groups of PNIPAm. Another explanation could be the effect of temperature on ionization, where increasing temperature increases Ka and decreases pKa, thereby increasing ionization in weak acids. The counter ion for PFOA in these experiments is Na$^+$, which has been shown to interact with the amide group of PNIPAm, showing greater interaction at higher temperatures.

PFOA Adsorption/Desorption Kinetics Using PNIPAm Hydrogels

In order to further understand and model the adsorption kinetics, a pseudo-second order (PSO) model that has been used to explain sorption rate whereby adsorption capacity is proportional to sorbent active sites occupied was used.

$$\frac{\partial q_t}{\partial t} = k_2(q_e - q_t)^2 \quad (4)$$

Here, $q_t$ and $q_e$ (mg/g) represent the amount of PFOA adsorbed at time, t (hrs), and at equilibrium respectively, while $k_2$ is the second order adsorption rate constant and $\vartheta_0$ is the initial adsorption rate (mg/g/h). By integrating from time 0 to time t, equation (4) can be rearranged as follows:

$$\frac{t}{q_t} = \frac{1}{k_2 q_e^2} + \frac{t}{q_e} = \frac{1}{\vartheta_0} + \frac{t}{q_e} \quad (5)$$

By plotting $t/q_t$ vs. t, a linear fit enables the determination of $q_e$ and $k_2$ values for both adsorption and desorption, as shown in Table 1 along with $R^2$ values. Kinetic adsorption and desorption values were calculated, and then used to calculate adsorption and desorption data points to compare with the experimental data, which are shown in FIGS. 7a and 7b. Over half of the adsorbed amount adsorbs in the first hour, and over half of the desorbed amount desorbs within the first hour, as shown in FIG. 7b. There is no longer any appreciable adsorption or desorption after 15 h.

TABLE 1

Pseudo-second order adsorption/desorption kinetic
rate values derived from experimental data.

| Temperature | $q_e$ (mg/g) | $k_2$ (g/mg/h) | $\vartheta_0$ (mg/g/h) | $R^2$ |
|---|---|---|---|---|
| 35° C. | 48 | 0.012 | 28 | 0.99 |
| 20° C. | 11 | 0.31 | 41 | 0.99 |

Here, the $q_e$ values can be compared to the equilibrium isotherm experimental data for consistency, and fall within 20% of the predicted value from the adsorption isotherms. The initial desorption rate was greater than the initial adsorption rate, both in the same range as PFOA adsorption onto GAC, reported as 16.2 mg/g/h, even though the distribution coefficients are lower.

EDS Analysis of PNIPAm Hydrogels with Adsorbed PFO

The molar ratio of Nitrogen (N) to Fluorine (F) is a good indicator of the amount of PFOA adsorbed, since Nitrogen is only present in the PNIPAm hydrogel and Fluorine is only present in the PFOA molecules. The approximate molar ratio of N:F is 52:1, and since there is 1 N present per PNIPAm monomer, and 15 F present per PFOA molecule, the molar ratio of PNIPAm monomers in the hydrogel to PFOA molecules can be approximated as 780:1, yielding an estimated 4.7 mg/g adsorbed. In the experimental equilibrium adsorption data found in Table 2, the amount adsorbed for that hydrogel was 3.5 mg/g, which is on the same order of magnitude. This analysis confirms the presence and adsorption of PFOA onto the PNIPAm hydrogels, but should not be used as a quantitative tool because of the high standard deviation of values between the three different sites of the sample.

TABLE 2

EDS elemental ratio analysis of PFOA (A) and of
the PNIPAm hydrogel with adsorbed PFOA (B).

| (A) PFOA | | (B) PNIPAm hydrogel with PFOA | |
|---|---|---|---|
| Element | At % | Element | At % |
| F | 62.0 | C | 66.4 |
| C | 28.8 | N | 18.7 |
| Na | 7.2 | O | 14.3 |
| O | 2.0 | F | 0.49 |

Adsorption of PFOA and PFOS onto PNIPAm Hydrogels Using Interaction Parameters

The adsorption of contaminants such as PFOA and PFOS onto PNIPAm in an aqueous environment can be explained using interaction parameters. When the temperature is below PNIPAm's LCST, the polymer swells with bound water (to its hydrophilic amide functional groups) and bulk water. Therefore, the adsorption of PFOA and PFOS onto the hydrogel can be partly explained by the difference between 1) the hydrogen bonding interaction ($\vartheta_h$) between the polymer's hydrophilic functional group and the hydrophilic groups of PFOA and PFOS (carboxylic and sulfonate groups respectively) and 2) the hydrogen bonding interaction ($\vartheta_h$) between the hydrophilic functional groups of PFOA and PFOS and the water. As temperature is raised and the isopropyl groups dehydrate to initiate chain collapse, adsorption can be partly explained by the difference between 1) the dispersion interaction ($\vartheta_d$) between the hydrophobic functional groups of PNIPAm (isopropyl) and of the target perfluorinated compound (fluorinated carbon tail) and 2) the hydrogen bonding interaction ($\vartheta_h$) between the hydrophilic functional groups of PFOA and PFOS (carboxylic and sulfonate groups respectively) and the water. The difference occurs because the amide groups in PNIPAm will release the bound water and interact with other PNIPAm amide groups following chain collapse. Any ionization effects on interaction are not considered here.

The effective interaction parameters for various compounds can be calculated using a group contribution method developed by Hansen and Beerbower. Barton found that it is convenient and reliable to use structural combination methods to estimate interaction parameters, and assumes additive cohesion parameter components for groups present in a molecule.

In order to compare the impact of these described interaction parameters on adsorption capacity, adsorption of PFOA and PFOS was compared. The hydrophobic fluorinated tail of both PFOA and PFOS are the same, and the dispersion interaction parameter associated with the tail is predicted to be around 20.8 MPa$^{1/2}$. However, the hydrophilic head groups of the two molecules differ. PFOA has a carboxylic group, which has a hydrogen bonding interaction parameter of 13.2 MPa$^{1/2}$ while PFOS has a sulfonate group, which has a higher hydrogen bonding interaction parameter. Sulfonic groups' affinity to form hydrogen bonds with OH groups has been shown to increase the interaction of compounds with polar solvents upon sulfonation. Therefore, it would be expected that PFOS would partition less into the PNIPAm hydrogels than PFOA because of the stronger hydrogen bonding interaction between its sulfonate head group and the surrounding aqueous environment. The lack of measured cohesive energy density (CED) values for sulfonated polymers causes uncertainty in using group contribution calculations to determine interaction parameters. While equilibrium adsorption of PFOS by PNIPAm is higher than adsorption of PFOA below the LCST, much like PFOS adsorption onto GAC and other adsorbents, it is much lower above the LCST due to the presence of the sulfonate group. Therefore, conducting temperature swing adsorption of PFOS using PNIPAm would not provide any new information.

Predicting Aqueous PFOA Solution Concentrations

Using the adsorption isotherm values, the potential to concentrate aqueous PFOA solutions can be examined. Given an initial aqueous PFOA concentration, the equilibrium adsorption isotherm can be used to determine the extent of adsorption by computing $q_e$ and $C_e$ from equations (6) and (7):

$$q_e = K_d C_e^{1/n} \quad (6)$$

$$C_i V_w = q_e m_h + C_e V_w$$

Equation (6) represents the adsorption isotherms. In equation (7), $C_i$ is the initial aqueous PFOA concentration, $V_w$ is the total water volume, and $m_h$ is the hydrogel mass. Equation (6) can be combined with equation (7) in order to determine both $C_e$ and $q_e$ values if the other values ($V_w$, $m_h$, $C_i$) are known, and then equation (5) can be used to find $q_t$ versus t values in order to predict adsorption versus time data. Assuming 1 g of PNIPAm hydrogels were placed in 20 mL of 20 mg/L aqueous PFOA and allowed to reach equilibrium at 35° C., the $K_d$ values indicate that 0.31 mg/g would be adsorbed, resulting in a final equilibrium concentration of 4.3 mg/L. Assuming the PNIPAm hydrogels with adsorbed PFOA are then removed and placed in 3 mL of pure water at 22° C., the $K_d$ values would indicate that 0.28 mg/g would remain adsorbed, resulting in a final equilibrium concentration of 11 mg/L. The final equilibrium concentration achieved was 10 mg/L, agreeing with the adsorption isotherm experiments in FIG. 6.

TABLE 3

Freundlich distribution coefficients of PFOA and PFOS onto PNIPAm hydrogels above and below PNIPAm's LCST.

|  | $K_d$ at 20° C. (L/g) | $K_d$ at 35° C. (L/g) |
| --- | --- | --- |
| PFOA | 0.026 | 0.073 |
| PFOS | 0.041 | 0.047 |

Membrane Adsorption/Desorption

PNIPAm-functionalized membrane adsorption and desorption of PFOA is plotted in FIG. 8. Using the hydrogel equilibrium isotherms, a value of 0.5 mg/L for $C_e$ would yield qe values of 0.04 mg/g for the PFOA adsorption isotherm. The upper limit of functionalized membrane adsorption of PFOA is on the same order of magnitude. Desorption was conducted with pure DIUF water at 20° C. After 300 mL of pure DIUF water was permeated, 80% of previously adsorbed PFOA was desorbed. The initial rates were calculated in terms of mg PFOA adsorbed/L of solution permeated. The initial adsorption rate was 0.14 mg/L, while the initial desorption rate was 0.17 mg/L. It was shown that after 80 mL of permeated solution (aqueous 0.5 mg/L PFOA for adsorption and pure DIUF for desorption), both adsorption and desorption rates were much lower. Therefore, for conducting temperature swing adsorption studies, only 80 mL was used for each adsorption and desorption cycle.

Temperature swing adsorption was conducted over 5 cycles, shown in FIGS. 9a and 9b. About 0.01 mg of PFOA was adsorbed after 80 mL of 0.5 mg/L of aqueous PFOA was permeated through the membrane at 3.5 bar and 35° C., meaning that about 25% of the 0.04 mg of permeated PFOA was adsorbed. Residence time had an impact on membrane adsorption performance. When 80 mL of pure water was passed through the membrane at the same pressure of 3.5 bar, at a temperature of 20° C., about 60% of the adsorbed PFOA was desorbed. For the next 4 cycles, adsorption capacity seemed to be constant after passing 80 mL of aqueous PFOA through the membrane at the same 3.5 bar pressure. Also, desorption was relatively constant at between 50 and 60% of the adsorbed amount. After the first adsorption/desorption cycle, however, more than 90% of the PFOA adsorbed in consequent adsorption cycle was desorbed in each following desorption cycle, indicating promise for the use of PNIPAm-functionalized membranes for temperature swing adsorption. While the pressure was held constant, the flux was maintained throughout each cycle with little deviation. Every time the temperature was raised to 35° C. for adsorption, the flux was around 10.6 LMH, while the flux dropped to around 1.2 LMH when the temperature was dropped to 20° C., with standard deviations of 0.5 LMH and 0.1 LMH, respectively. The ability to quickly and easily desorb contaminant from the functionalized membrane is encouraging for use as an adsorbent with greater regeneration ability than other adsorbents.

In order to confirm that desorption using pure water must be conducted below LCST, two adsorption/desorption cycles were conducted using 0.5 mg/L aqueous PFOA for each adsorption cycle and pure DIUF for each desorption cycle, shown in FIG. 10. In both cases, adsorption was conducted above PNIPAm's LCST, while the first desorption cycle was conducted below PNIPAm's LCST. However, for the second desorption cycle, pure DIUF at 35° C. was used rather than at 20° C. to prove that desorption is insignificant if T>LCST. For the first cycle, 0.016 mg of PFOA was adsorbed, followed by about 60% desorption using pure water at 20° C. A second adsorption cycle yielded the same adsorption capacity as the first cycle. However, only 13% of adsorbed PFOA was desorbed using water above LCST, compared to 60% with 20° C. water, thereby proving that LCST behavior plays a role in enhancing desorption. In the control run, where PFOA was permeated through a blank PVDF membrane, less than 1% was adsorbed, indicating that adsorption takes place in the polymeric PNIPAm domain. Flux above LCST was constant at 37 LMH, while flux below LCST was 2.5 LMH. Pressure was set at 2.75 bar because the functionalized membrane used was not as tight as the one used for the temperature swing adsorption cycles.

CONCLUSION

The reversible swelling behavior of PNIPAm, in hydrogel form and within membrane pores, is confirmed for use as a temperature swing adsorbent. Even though the Freundlich distribution coefficient of 0.073 L/g for PFOA is less than other adsorbent materials, the initial PFOA adsorption rate of 28 mg/g/h onto PNIPAm hydrogels is comparable to published PFOA adsorption rates using other adsorbents such as GAC. The ability to then desorb PFOA at an even higher initial rate than adsorption, and recycle the PNIPAm cost effectively when immobilized in PVDF membrane pores, makes PNIPAm and the use of stimuli responsive polymeric materials a new and attractive avenue for the reversible adsorption and treatment of PFCs. Temperature swing adsorption was conducted over 5 cycles, where 60% of the PFOA adsorbed in the first cycle was desorbed, followed by desorption of over 90% of the PFOA adsorbed in the subsequent cycles. Regeneration of adsorbents for PFCs is an area that requires advancement, and temperature swing adsorption using stimuli responsive membranes is promising. Stimuli-responsive, functionalized polymeric membranes for reversible contaminant adsorption with high initial rates provide a very exciting technology for the possible removal of toxic organic contaminants removal from water.

The foregoing has been presented for purposes of illustration and description. It is not intended to be exhaustive or to limit the embodiments to the precise form disclosed. Obvious modifications and variations are possible in light of the above finding. For example, PFC-adsorbing temperature responsive polymer hydrogel, not bound to a membrane, may be added to an adsorption contactor including PFC-contaminated water above the predetermined temperature that promotes adsorption of the PFCs from the PFC-contaminated water by the hydrogel. As that PFC adsorption by the hydrogel approaches hydrogel capacity, the hydrogel may be removed from the adsorption contactor to a desorption contactor including a cooling fluid at a temperature below the predetermined temperature in order to release the PFCs from the hydrogel and regenerate the hydrogel for PFC adsorption. These steps are then repeated.

All such modifications and variations are within the scope of the appended claims when interpreted in accordance with the breadth to which they are fairly, legally and equitably entitled.

What is claimed:

1. A purification device for removing perfluorinated compounds (PFCs) from PFC-contaminated water, comprising:
a membrane including a PFC-adsorbing temperature responsive polymer hydrogel in pores of the membrane;
a contactor in which the membrane is contacted with the PFC-contaminated water and a temperature of the PFC-adsorbing temperature responsive polymer hydrogel is raised above a predetermined temperature at which PFCs are adsorbed from the PFC-contaminated water by the PFC-adsorbing temperature responsive polymer hydrogel;
a heating device heating at least one of the PFC-contaminated water and the PFC-adsorbing temperature responsive polymer hydrogel in the contactor;
a cooling device for cooling at least one of a cooling fluid and the PFC-adsorbing temperature responsive polymer hydrogel in the contactor to release PFCs from the PFC-adsorbing temperature responsive polymer hydrogel, regenerate the PFC-adsorbing temperature responsive polymer hydrogel and collect the PFCs in the cooling fluid; and
a cooling fluid source, a PFC-contaminated water source and an inlet valve selectively connecting the cooling fluid source and the PFC-contaminated water source with the contactor.

2. The purification device of claim 1, including a discharge valve downstream from the membrane having a first outlet for treated water and a second outlet for cooling fluid with the PFCs in the cooling fluid.

3. The purification device of claim 2, including a drain valve downstream from the discharge valve, the drain valve having a PFC recovery outlet and a cooling fluid recycling outlet connected to the cooling fluid source.

4. The purification device of claim 1, wherein the PFC-adsorbing temperature responsive polymer hydrogel is selected from a group of polymers consisting of poly-N-isopropylacrylamide (PNIPAm), substituted poly-N-isopropylacrylamide, poly(vinyl ether), poly(N-vinyl caprolactam), poly(N-vinyl isobutyramide) and combinations thereof.

5. The purification device of claim 4, wherein the membrane is selected from a group of membranes consisting of polysulfone, polyethersulfone, cellulose acetate, polypropylene, polyester, polyacrylonitrile, polyamide, polyimide, polyvinylidene fluoride (PVDF) and combinations thereof.

6. The purification device of claim 1, wherein the membrane is selected from a group of membranes consisting of polysulfone, polyethersulfone, cellulose acetate, polypropylene, polyester, polyacrylonitrile, polyamide, polyimide, polyvinylidene fluoride (PVDF) and combinations thereof.

* * * * *